(12) United States Patent
Itoh et al.

(10) Patent No.: US 7,835,590 B2
(45) Date of Patent: Nov. 16, 2010

(54) IMAGE PROCESSING APPARATUS AND IMAGING DEVICE

(75) Inventors: Goh Itoh, Tokyo (JP); Ryosuke Nonaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 897 days.

(21) Appl. No.: 11/727,147

(22) Filed: Mar. 23, 2007

(65) Prior Publication Data
US 2008/0050031 A1 Feb. 28, 2008

(30) Foreign Application Priority Data
Aug. 24, 2006 (JP) ............................... 2006-228407

(51) Int. Cl.
*G06K 9/36* (2006.01)
(52) U.S. Cl. ........................ 382/284; 382/260; 382/274; 382/275
(58) Field of Classification Search ................. 382/260, 382/274, 275, 284
See application file for complete search history.

(56) References Cited

U.S. PATENT DOCUMENTS 7,006,881 B1 * 2/2006 Hoffberg et al. ............... 700/83
7,027,054 B1 * 4/2006 Cheiky et al. ............... 345/473
7,110,864 B2 * 9/2006 Restrepo et al. ............. 700/293
7,112,762 B2 * 9/2006 Finley et al. ................. 219/201
7,124,041 B1 * 10/2006 Johnson et al. ............... 702/58

FOREIGN PATENT DOCUMENTS

JP   2001-352486   12/2001
JP   2003-8935      1/2003

\* cited by examiner

*Primary Examiner*—Yosef Kassa
(74) *Attorney, Agent, or Firm*—Finnegan, Henderson, Farabow, Garrett & Dunner, L.L.P.

(57) ABSTRACT

An image processing apparatus generates a brightness component image of a low-sensitivity image by applying a smoothing filter to the low-sensitivity image, generates a brightness component image of a high-sensitivity image by applying the smoothing filter to the high-sensitivity image, generates a contrast component image of the low-sensitivity image by dividing the low-sensitivity image by the brightness component image of the low-sensitivity image, generating a contrast component image of the high-sensitivity image by dividing the high-sensitivity image by the brightness component image of the high-sensitivity image, generates a combined brightness component image by combining the brightness component images of the low-sensitivity image and of the high-sensitivity image, generates a combined contrast component image by combining the contrast component images of the low-sensitivity image and of the high-sensitivity image, and finally generates a contrast-expanded image by multiplying the combined brightness component image and the combined contrast component image.

11 Claims, 15 Drawing Sheets

F I G . 3

( EXAMPLE OF COEFFICIENTS OF 3×3 GAUSSIAN FILTER )

| 0.075 | 0.125 | 0.075 |
|---|---|---|
| 0.125 | 0.2 | 0.125 |
| 0.075 | 0.125 | 0.075 |

( EXAMPLE OF COEFFICIENTS OF 3×3 GAUSSIAN FILTER )

| 0.111 | 0.111 | 0.111 |
|---|---|---|
| 0.111 | 0.112 | 0.111 |
| 0.111 | 0.111 | 0.111 |

HALO PHENOMENON OCCURRING AT A BOUNDARY OF THE OBJECT

BRIGHTNESS COMPONENT IMAGE

FIG. 5A

WHEN WEIGHT IS APPLIED MORE TO CENTER PIXEL

| 0.0 | 0.0 | 0.0 |
|---|---|---|
| 0.0 | 1.0 | 0.0 |
| 0.0 | 0.0 | 0.0 |

FIG. 5B

WHEN WEIGHT IS APPLIED ALSO TO PERIPHERAL PIXELS

| 0.111 | 0.111 | 0.111 |
|---|---|---|
| 0.111 | 0.112 | 0.111 |
| 0.111 | 0.111 | 0.111 |

LEVEL OF BRIGHTNESS COMPONENT IMAGE OF LOW-SENSITIVITY IMAGE

LEVEL OF BRIGHTNESS COMPONENT IMAGE OF LOW-SENSITIVITY IMAGE

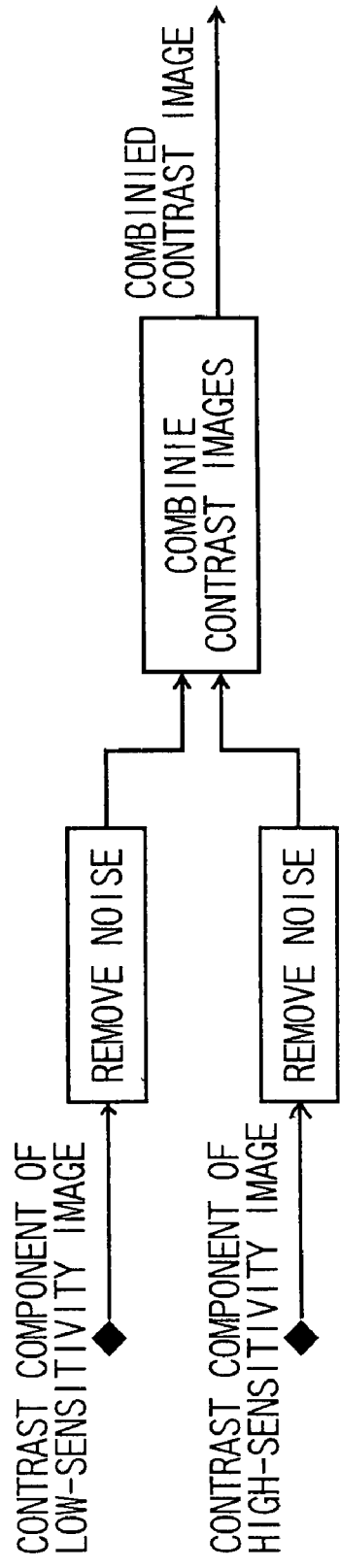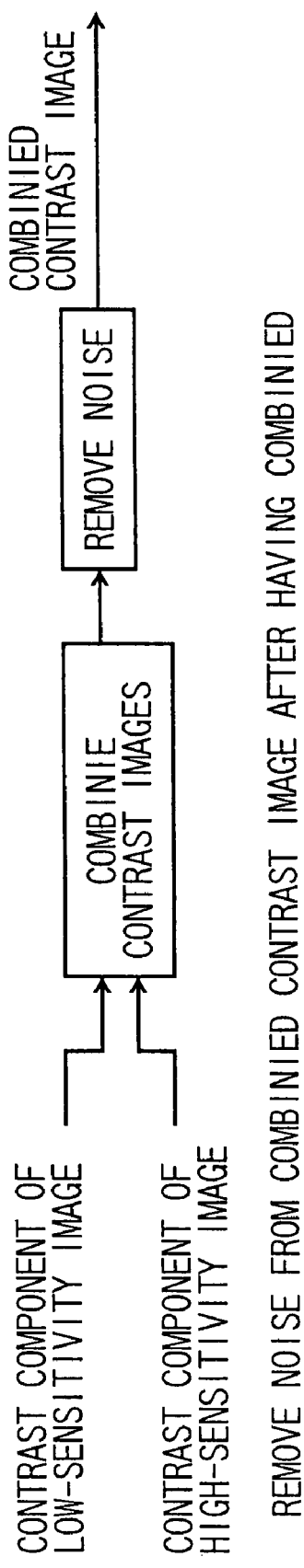

ELEMENT FOR LOW-SENSITIVITY IMAGE 216

ELEMENT FOR HIGH-SENSITIVITY IMAGE 218

FIG.16

| ITEM | LOW-SENSITIVITY IMAGE | HIGH-SENSITIVITY IMAGE |
|---|---|---|
| GRADATION CHARACTERISTIC OF DARK AREA | BLACK AND GRADATION IS LOST | GRADATION IS EXPRESSED |
| GRADATION CHARACTERISTIC OF BRIGHT AREA | GRADATION IS EXPRESSED | WHITELY SATURATED AND GRADATION IS LOST |
| NOISE OF DARK AREA | MOST OF NOISES ARE OF PICTURING SYSTEM | NOISE OF PICTURING SYSTEM AND SIGNAL OF OBJECT ARE MIXED |
| NOISE OF BRIGHT AREA | LOW NOISE | MOST OF NOISES ARE OF PICTURING SYSTEM |

FIG. 17

| IMAGE PROCESSING | DARK AREA | BRIGHT AREA |
|---|---|---|
| L_GLC | SINCE MUCH NOISE IS INCLUDED, APPLY NOISE REMOVAL PROCESS STRONGLY | NOISE REMOVAL IS NOT NECESSARY BUT LITTLE |
| H_GLC | SINCE MUCH SIGNAL COMPONENT IS INCLUDED, JUST APPLY GAUSSIAN NOISE REMOVAL | SINCE SATURATED, AND HENCE MUCH NOISE IS INCLUDED, APPLY NOISE REMOVAL PROCESS STRONGLY |
| L_LLC | SINCE MUCH NOISE IS INCLUDED, APPLY NOISE REMOVAL PROCESS STRONGLY | SINCE MUCH SIGNAL COMPONENT IS INCLUDED, JUST APPLY GAUSSIAN NOISE REMOVAL. EMPHASIZING IS ALSO EFFECTIVE |
| H_LLC | SINCE MUCH SIGNAL COMPONENT IS INCLUDED, JUST APPLY GAUSSIAN NOISE REMOVAL | SINCE MUCH NOISE IS INCLUDED, APPLY NOISE REMOVAL PROCESS STRONGLY |

IMAGE PROCESSING APPARATUS AND IMAGING DEVICE

CROSS-REFERENCE TO RELATED APPLICATIONS

This application is based upon and claims the benefit of priority from the prior Japanese Patent Application No. 2006-228407, filed on Aug. 24, 2006; the entire contents of which are incorporated herein by reference.

TECHNICAL FIELD

The present invention relates to an image processing apparatus for expanding contrast of a picked-up image to generate an image with good visibility, which is effective for an imaging device which can acquire a high-sensitivity picked-up image and a low-sensitivity picked-up image as input images, and to the imaging device.

BACKGROUND OF THE INVENTION

In an image obtained by picking up a dark object, gradation in a dark area is not sufficiently reproduced, and hence a blackened image is obtained. In contrast, in an image obtained by picking up a bright object, since more electric charges are formed in comparison with the charge storage amount of an imaging element, an image saturated in white is obtained. Both cases have a problem that images having inferior visibility are obtained since gradation characteristics of the images cannot be reproduced.

In order to solve this problem, a method of expanding contrast by generating a combined image from two images having different picking-up conditions is proposed in Japanese Application Kokai No. 2001-352486. In Japanese Application Kokai No. 2001-352486, a basic concept is to emphasize a certain space frequency component in an image, and high-frequency component of the image picked up with short exposure time is not emphasized, and the high-frequency component of the image picked up with long exposure time is emphasized for combining these images.

Further description will be made about characteristics of the image with low charge storage. Such an image has a large blackened area and has much noise in the dark area as described above, but the contrast in a bright area is high. Hereinafter, the image picked up with a low sensitivity as described above is referred to as "low-sensitivity image".

Further description will now be made about characteristics of the image with high charge storage. Such an image has a large area saturated in white, but the contrast in the dark area is high as described above. Hereinafter, the image picked up with a high sensitivity as described above is referred to as "high-sensitivity image".

As a method of picking up the low-sensitivity image, there are a method of reducing the exposure time, and a method of reducing the surface area of an aperture of a light-receiving element. On the other hand, as a method of picking up a high-sensitivity image, there are a method of increasing the exposure time and a method of increasing the surface area of the aperture of the light-receiving element.

Therefore, in Japanese Application Kokai No. 2001-352486, improvement in visibility of the image is aimed by emphasizing the high-frequency component of the high-sensitivity image while reducing noises by not emphasizing the high-frequency component of the low-sensitive image, and combining the respective images. However, the emphasized area is an edge of the dark area and low-frequency component in the bright area of the object, but no effect appears in the low-frequency component of the dark area and the edge component of the bright area. Therefore, the method in Japanese Application Kokai No. 2001-352486 does not correspond essentially to the method of emphasizing the contrast.

The method of emphasizing the contrast is disclosed in Japanese Application Kokai No. 2003-8935. In the method disclosed in Japanese Application Kokai No. 2003-8935, since the contrast with respect to a local area in a screen is emphasized, emphasizing of the contrast is achieved by calculating a superimposed value using pixel values in the periphery of a target pixel using a smoothing filter (epsilon filter) that stores an edge area of an input image, and determining the target pixel value is divided by the superimposed value as the contrast.

However, in Japanese Application Kokai No. 2003-8935, since there is no change between the pixel in question and the peripheral pixels in the blackened area or the white saturated area, and hence the contrast is 1, it is not suitable for emphasis. In other words, with the method disclosed in Japanese Application Kokai No. 2003-8935, since information is already lost, the contrast between the pixel in question and the peripheral pixels cannot be enhanced.

As described above, the contrast between the pixel in question and the peripheral pixels (hereinafter, referred to as "local contrast") cannot be emphasized adequately from the dark area to the bright area by using the methods described above.

Accordingly, it is an object of the invention to provide an image processing apparatus that can generate an image with good visibility by emphasizing local contrast using at least two low-sensitivity image and high-sensitivity image and an imaging device therefor.

BRIEF SUMMARY OF THE INVENTION

According to a first aspect of the invention, there is provided an image processing apparatus including: a first image generator that generates each of a plurality of first images by applying a smoothing filter to each of a plurality of input images of a single object picked up with various sensitivities; a second image generator that generates each of a plurality of second images by dividing a pixel value of each pixel of the input image by a pixel value of a collocated pixel of the each first image; a third image generator that generates a third image by adding pixel values of collocated pixels in the first images; a fourth image generator that generates a fourth image by multiplying the pixel values of collocated pixels in the second images; and an output image generator that generates an output image by multiplying a pixel value of each pixel of the third image and a pixel value of a collocated pixel of the fourth image.

According to another aspect of the invention, there is provided an imaging device including an image pick-up unit that picks up the input images of the single object with at least two sensitivities, wherein the input images is processed by the image processing apparatus according to the first aspect of the invention.

According to the aspects of the invention, the input images in various sensitivities are acquired to generate an image with a good visibility in which the contrast is expanded from the input images.

BRIEF DESCRIPTION OF THE DRAWINGS

FIG. 3 shows tables showing coefficients of a filtering process according to a third embodiment;

FIGS. 5A and 5B show another filtering coefficient of the same embodiment;

FIGS. 11A and 11B are block diagrams of the image processing apparatus according to a seventh embodiment;

FIG. 16 is a table showing the difference between a low-sensitivity image and a high-sensitivity image in the image processing apparatus in the first embodiment; and FIG. 17 is a table showing characteristics of the various types of image processing in the image processing apparatus according to the first embodiment.

DETAILED DESCRIPTION OF THE INVENTION

An image processing apparatus 10 which generates a contrast-expanded image from a low-sensitivity image and a high-sensitivity image picked up in two different sensitivities will be described in a first embodiment to an eighth embodiment, and then an imaging device 200 for picking up the low-sensitivity image and the high-sensitivity image in a ninth embodiment to an eleventh embodiment.

First Embodiment

Figure 1:
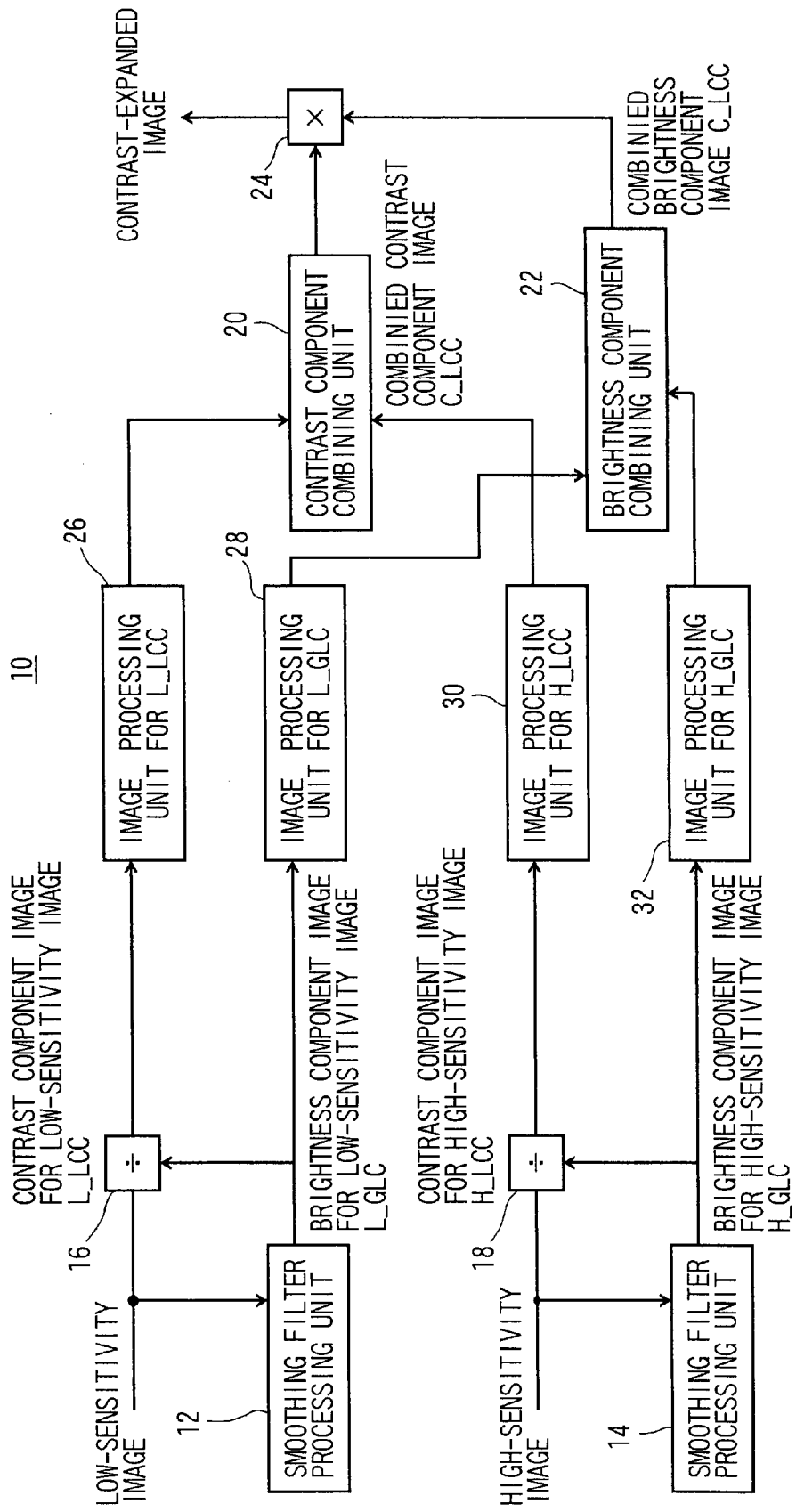
FIG. 1 is a block diagram of an image processing apparatus according to a first embodiment of the invention.

Referring now to FIG. 1, FIGS. 16 and 17, the image processing apparatus 10 according to a first embodiment of the invention will be described.

(1) Description of Low-Sensitivity Image, High-Sensitivity Image

The image processing apparatus 10 receives a supply of monochrome low-sensitivity image and high-sensitivity image. The low-sensitivity image and the high-sensitivity image are the images described above.

In the description of the embodiments shown below, it is assumed that the image data has gradation levels (level of brightness) from 0 to 255 and, in order to simplify the description, the relation between the gradation levels and the brightness is assumed to be 1:1. However, the relation between the gradation level and the brightness level of the image data may be the relation which follows a predetermined curve in advance.

(2) Configuration of Image Processing Apparatus 10

Referring now to FIG. 1, a configuration of the image processing apparatus 10 will be described. FIG. 1 is a block diagram of the image processing apparatus 10 according to the first embodiment.

The image processing apparatus 10 includes a smoothing filter processing unit 12, a smoothing filter processing unit 14, a divider 16, a divider 18, a contrast component combining unit 20, a brightness component combining unit 22, a multiplier 24, an L_LCC image processing unit 26, an L_GLC image processing unit 28, an H_LCC image processing unit 30, and an H_GLC image processing unit 32. The functions of these units 12 to 32 are realized also by a program stored in a computer.

(2-1) Smoothing Filter Processing Units 12, 14

Firstly, in the smoothing filter processing unit 12, a brightness component image of the low-sensitivity image shown by an expression (1) shown below (hereinafter, referred to as L_GLC) is generated by applying the smoothing filter to the low-sensitivity image. Subsequently, image processing is applied to the L_GLC by the L_GLC image processing unit 28. The image processing performed here will be described later.

In the same manner, the smoothing filter processing unit 14 generates a brightness component image (hereinafter, referred to as H_GLC) of the high-sensitivity image shown by an expression (2) shown below by applying the smoothing filter also of the high-sensitivity image. As described later, different smoothing filters may be used here for the low-sensitivity image and the high-sensitivity image. Subsequently, the image processing is applied to the H_GLC by the H_GLC image processing unit 32. The image processing performed here will be described later.

$$P_{L\_GLC}(x, y) = \sum_{i=-k}^{k} \sum_{j=-l}^{l} T_{L\_GLC}(i, j) \cdot X(x-i, y-j) \quad (1)$$

$P_{L\_GLC}(x, y)$: brightness component image data of a low-sensitivity image at a pixel position (x, y)

$T_{L\_GLC}(i, j)$: filter coefficient of a smoothing filter for the low-sensitivity image $X(x, y)$: image data of the low-sensitivity image at the pixel position (x, y)

k: lateral pixel range to be filtered l: vertical pixel range to be filtered $$P_{H\_GLC}(x, y) = \sum_{i=-k}^{k} \sum_{j=-l}^{l} T_{H\_GLC}(i, j) \cdot X(x-i, y-j) \quad (2)$$

$P_{H\_GLC}(x, y)$: brightness component image data of a high-sensitivity image at the pixel position (x, y)

$T_{H\_GLC}(i, j)$: filter coefficient of the smoothing filter for the high-sensitivity image $X(x, y)$: image data of the high-sensitivity image at the pixel position (x, y)

k: lateral pixel range to be filtered l: vertical pixel range to be filtered

(2-2) Dividers 16, 18

Subsequently, the divider 16 divides the low-sensitivity image by the L_GLC to generate a contrast component image of the low-sensitivity image shown by an expression (3) (hereinafter, referred to as L_LCC). Subsequently, the image processing is applied to the L_LCC by the L_LCC image processing unit 26. The image processing performed here will be described later.

In the same manner, the divider 18 divides the high-sensitivity image by the H_GLC to generate a contrast component image of the high-sensitivity image shown by an expression (4) (hereinafter, referred to as H_LCC). Subsequently, the image processing is applied to the H_LCC by the H_LCC image processing unit 30. The image processing performed here will be described later.

Generally, when the processing with the smoothing filter is performed, the low space frequency component of an original image is extracted. Therefore, by subtracting the low space frequency component from the original image, the high space frequency component can be obtained. However, since division is performed instead of subtraction in the first embodiment, the low space frequency component is regarded as an average luminance in the screen to obtain the ratio with respect to the pixel in question, that is, the contrast. Therefore, the image after division is regarded as a contrast component image.

$$Q_{L\_LCC}(x,y)=X_{L\_GLC}(i,j)/P_{L\_GLC}(i,j) \quad (3)$$

$Q_{L\_LCC}(x,y)$: contrast component image data of the low-sensitivity image at the pixel position (x, y)

$Q_{H\_LCC}(x,y)$: contrast component image data of the high-sensitivity image at the pixel position (x, y)

$$Q_{H\_LCC}(x,y)=X_{H\_GLC}(i,j)/P_{H\_GLC}(i,j) \quad (4)$$

In FIG. 1, the image processing is performed separately for P(x, y) and Q (x, y) respectively. However, various methods can be performed mainly for eliminating noises or improvement of gradation characteristics. Combining of the brightness components and combining of contrast components are expressed in an expression first and detailed description will be described later.

(2-3) Brightness Component Combining Unit 22

Subsequently, the brightness component combining unit 22 combines the L_LCC and the H_LCC as shown in an expression (5), and forms a combined contrast component image (hereinafter, referred to as C_LCC).

$$P_{C\_GLC}(x,y)=\alpha \cdot P_{LGLC}(i,j)+\beta \cdot P_{H\_GLC}(i,j) \quad (5)$$

$P_{C\_GLC}(X, y)$: brightness component image data of a combined image at the pixel position (x, y)

α: weight coefficient for the brightness component image of the low-sensitivity image β: weight coefficient for the brightness component image of the high-sensitivity image

(2-4) Contrast Component Combining Unit 20

Subsequently, the contrast component combining unit 20 combines the L_GLC and the H_GLC to generate a combined brightness component image (hereinafter, referred to as C_GLC) as shown by an expression (6).

$$Q_{C\_LCC}(x,y)=\lambda \cdot Q_{L\_LCC}(i,j) \times \mu \cdot Q_{H\_LCC}(i,j) \quad (6)$$

$Q_{C\_LCC}(x, y)$: contrast component image data of the combined image at the pixel position (x, y)

λ: weight coefficient for the contrast component image of the low-sensitivity image μ: weight coefficient for the contrast component image of the high-sensitivity image As is clear from the expression (6), λ and μ each are expressed by a single coefficient, and finally, can be treated as a contrast emphasis coefficient.

(2-5) Multiplier 24

Finally, the multiplier 24 multiplies the C_GLC and the C_LCC to generate a contrast-expanded image as shown by an expression (7).

$$R(x,y)=P_{C\_GLC}(i,j) \times \gamma \cdot Q_{C\_LCC}(i,j) \quad (7)$$

R(x, y): image data after a contrast-expanding process at the pixel position (x, y)

γ: contrast emphasis coefficient

As described above, from the expression (6) and the expression (7), the relation is expressed as $\gamma = \lambda \cdot \mu$.

(3) Description of Image Processing

Subsequently, the image processing performed by the L_GLC image processing unit 28, the H_GLC image processing unit 32, the L_LCC image processing unit 26, and the H_LCC image processing unit 30 will be described.

The differences between the low-sensitivity image and the high-sensitivity image are listed in a table in FIG. 16.

In view of description shown above, the respective types of image processing can be characterized as shown in a table in FIG. 17.

Therefore, it is preferable to design a filter which satisfies the characteristics as shown above. Impulsive noise may be contained in addition to Gaussian noise, and hence a non-linear filter, described later, may also be used effectively.

(4) Effects

The image processing apparatus 10 according to the first embodiment, a monochrome image with high contrast and high visibility can be generated in the dark area and in the bright area by expanding the contrast with the low-sensitivity image having high contrast in the bright area and the high-sensitivity image having high contrast in the dark area.

Second Embodiment

Figure 2:
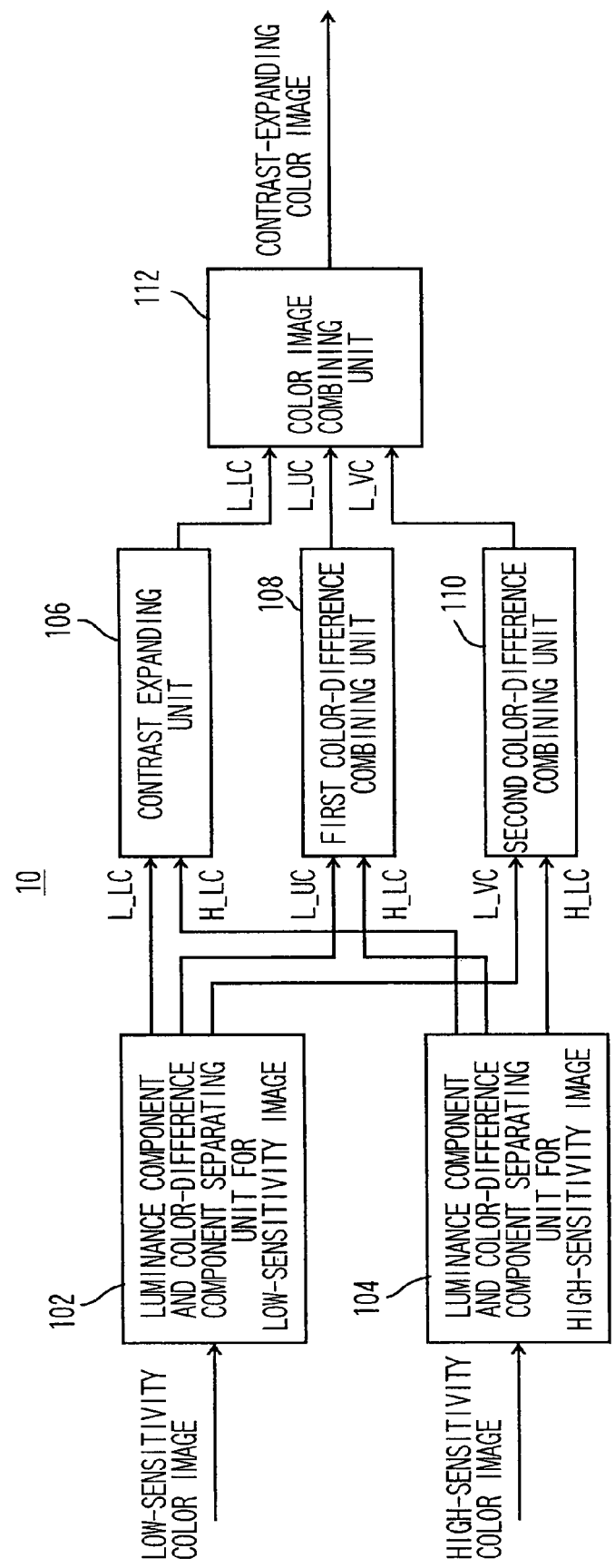
FIG. 2 is a block diagram of the image processing apparatus according to a second embodiment.

Referring now to FIG. 2, the image processing apparatus 10 according to a second embodiment of the invention will be described.

(1) Description of Low-Sensitivity Image and High-Sensitivity Image

The image processing apparatus 10 receives a supply of a color image with a high contrast from a color low-sensitivity image and a color high-sensitivity image.

Then, the image processing apparatus 10 extracts a luminance component image, a first color-difference component image and a second color-difference component image from the color low-sensitivity image and the color high-sensitivity image, and generates a contrast-expanded image regarding the illuminance component by performing the same method as the image processing apparatus 10 according to the first embodiment on the luminance component image. On the other hand, the image processing apparatus 10 performs the image processing on the first color-difference component image and the second color-difference component image for obtaining average values thereof, and combines the images after processing again to generate a contrast-expanded color image.

(2) Configuration of Image Processing Apparatus 10

FIG. 2 is a block diagram showing the image processing apparatus 10 according to the second embodiment, and will be described in sequence below.

(2-1) Separating Units 102, 104

The separating unit 102 for separating the luminance component and the color-difference component in the low-sensitivity image extracts the low-sensitivity luminance component image (hereinafter, referred to as L_LC) from a color low-sensitivity image, a low-sensitivity first color-difference component image (hereinafter, referred to as L_UC) and a low-sensitivity second color-difference component image (hereinafter, referred to as L_VC).

The separating unit 104 for separating the luminance component and the color-difference component in the high-sensitivity image extracts the high-sensitivity luminance component image (hereinafter, referred to as H_LC) from a color high-sensitivity image, a high-sensitivity first color-difference component image (hereinafter, referred to as H_UC) and a high-sensitivity second color-difference component image (hereinafter, referred to as H_VC).

(2-2) Contrast Expanding Unit 106

The contrast expanding unit 106 performs a processing in the same manner as the image processing apparatus 10 in the first embodiment, and generates a contrast-expanded image C_LC.

The processing will be performed as shown below in detail. Description of the expressions in the respective steps in the luminance component image will be omitted because they are the same processing as the expressions (1) to (7) in the first embodiment.

As regards the low-sensitivity image, the smoothing filter is applied on the L_LC, to generate the brightness component image L_GLC of the low-sensitivity image.

In the same manner, as regards the high-sensitivity image, the smoothing filter is applied on the H_LC to generate the brightness component image H_GLC of the high-sensitivity image.

Subsequently, the contrast component image L_LCC of the low-sensitivity image is generated by dividing by the L_GLC of the low-sensitivity image.

In the same manner, the contrast component image H_LCC of the high-sensitivity image is generated by dividing by the high-sensitivity image H-GLC.

Subsequently, the L_GLC and the H_GLC are combined to generate the combined brightness component image C_GLC.

Then, the L_LCC and the H_LCC are combined to generate the combined contrast component image C_LCC.

Then, the C_GLC and the C_LCC are multiplied to generate the contrast-expanded image C_LC.

(2-3) First Color-Difference Component Combining Unit 108

The first color-difference component combining unit 108 combines the L_UC and the H_UC and generates a combined first color-difference component image C_UC as shown by an expression (8).

$$P_{C\_HC}(x,y) = \alpha \cdot P_{L\_HC}(i,j) + \beta \cdot P_{H\_HC}(i,j) \qquad (8)$$

$P_{C\_HC}(x, y)$: first color-difference component image data of combined image at the pixel position (x, y)

α: weight coefficient for the first color-difference component image of the low-sensitivity image β: weight coefficient for the first color-difference component image of the high-sensitivity image

(2-4) Second Color-Difference Component Combining Unit 110

The second color-difference component combining unit 110 combines the L_VC and the H_VC to generate a combined second color-difference component image C_VC as shown by an expression (9).

$$P_{C\_SC}(x,y) = \alpha \cdot P_{L\_SC}(i,j) + \beta \cdot P_{H\_SC}(i,j) \qquad (9)$$

$P_{C\_SC}(x,y)$: second color-difference component image data of the combined image at the pixel position (x, y)

α: weight coefficient for the second color-difference component image of the low-sensitivity image β: weight coefficient for the second color-difference component image of the high-sensitivity image

(2-5) Color Image Generator 112

Finally, the color image generator 112 combines the C_LC, the C_UC and the C_VC to generate a contrast-expanded color image.

(3) Effects

The image processing apparatus 10 according to the second embodiment, the contrast is expanded by the low-sensitivity image having high contrast in the bright area and the high-sensitivity image having high contrast in the dark area so that a high-contrast color image which demonstrates high-visibility both the dark area and the bright area can be generated.

(4) Modification 1

Although the same sign is used as a weighted coefficient both in the brightness component image, the first color-difference component image and the second color-difference component image here, it is possible to combine these images after having changed the ratio respectively.

In the case of the low-sensitivity image, since a bright object can generally be captured, picking up in good color is achieved. In contrast, in the case of the high-sensitivity image, although a dark object can be captured, colors may be off-balanced because the intensity is not sufficient depending on the color.

Therefore, a good color image can be obtained easier by weighting the first color-difference component and the second color-difference component picked up as the low-sensitivity image with a higher ratio.

(5) Modification 2

The luminance component image, the first color-difference component image and the second color-difference component image used above can be obtained by calculating a luminance component (Y), a first color-difference component (U), and a second color-difference component (V) by the following expression from red component (R), green component (G) and blue component (B) as the input image signals. Such an image conversion method can employ calculation which is generally specified by Broadcast Standard as needed.

$$Y = 0.299R + 0.587G + 0.114B \qquad (10)$$

$$U = -0.169R - 0.331G + 0.500B \qquad (11)$$

$$V = 0.500R - 0.419G - 0.081B \qquad (12)$$

Third Embodiment

Referring now to FIG. 3 to FIG. 8, the image processing apparatus 10 according to a third embodiment of the invention will be described.

(1) Halo Phenomenon

The brightness component image corresponds generally to outside light or illumination light in the video contents of the input image, and hence is a uniform luminance component for an object. In other words, it corresponds to a low space frequency component, it is effective to pass the input image through a low-pass filter for generating the brightness component image. The low-pass filter is referred to as "smoothing filter" hereinafter.

Various types of smoothing filter can be employed, and a basic filter is a linear filter which performs an operation by convoluting the filter coefficient to a constant value. For example, examples of the filter coefficients of the Gaussian Filter and an average value filter are shown in FIG. 3.

Figure 4A:
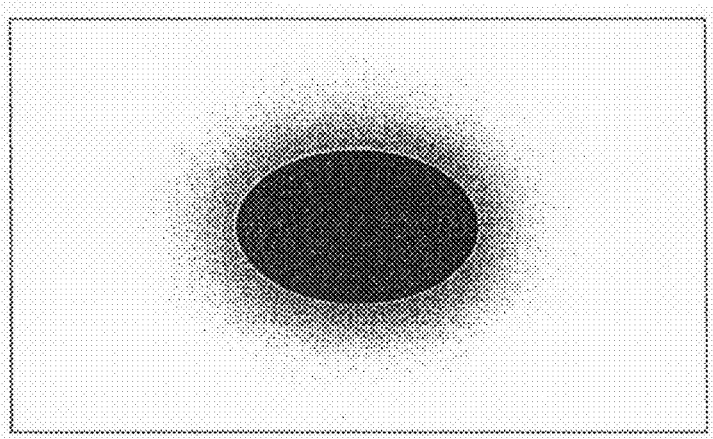
FIGS. 4A and 4B are explanatory drawings showing Halo phenomenon of the same embodiment.
Figure 4B:
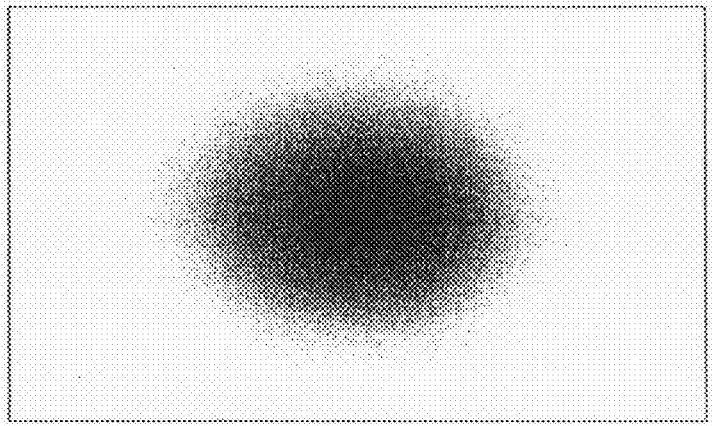

In the case in which such a linear filter is employed, the luminance fluctuations (hereinafter, referred to as Halo phenomenon) at a boundary of the object as shown in FIG. 4A occur depending on the image. The reason of occurrence of this phenomenon is that when the linear filter is used, even though the brightness component image is the boundary of the object, a uniform filtering process is performed and hence signal is interfused between adjacent objects (black round object and white background in this case) as shown in FIG. 4B.

(2) Method of Improving Halo Phenomenon

(2-1) First Method

As a first method for improving the Halo phenomenon, a method of using a plurality of linear filters to generate a plurality of brightness component images and contrast component images, respectively, and adding the weight to the respective component images again can be employed.

In the respective embodiments described above, the above-described method can be employed for the low-sensitivity image and the high-sensitivity image respectively.

(2-2) Second Method

Referring now to FIG. 5, a second method for improving Halo phenomenon will be described. FIG. 5A shows an example of a filter in which the coefficient of a pixel at the center is sufficiently larger than the coefficients of the peripheral pixels. FIG. 5B is an example of a filter in which the difference between the coefficient of the pixel at the center and the coefficients of the peripheral pixels is small.

As a second method, there is a method of differentiating the filter coefficient between the low-sensitivity image and the high-sensitivity image.

In the low-sensitivity image, the contrast of the bright object is maintained, and in contrast, the dark object is blackened. On the other hand, in the high-sensitivity image, the bright object is saturated in the white side and hence whitened, and the contrast of the dark object is maintained.

Therefore, in the low-sensitivity image, in order to make the brightness component of the bright object closer to the signal value of the input image, when the signal value of the input image of the pixel at the center is higher than the threshold value of the low-sensitivity image, a filter in which the coefficient of the pixel at the center is sufficiently larger than the coefficients of the peripheral pixels is used. In the high-sensitivity image, in order to make the brightness component of the dark object closer to the pixel value of the input image, when the signal value of the input image of the pixel at the center is lower than the threshold value of the high-sensitivity image, a filter in which the coefficient of the pixel at the center is sufficiently larger than the coefficients of the peripheral pixels is used.

In other words, the filter coefficient is changed according to the luminance level of the center pixel of a block to be processed with the filter, or the average luminance level in the block. For example, in the low-sensitivity image, when the luminance level at the center pixel is high, the filter shown in FIG. 5A is used, and when the luminance level of the center pixel is low, the filter shown in FIG. 5B is used. On the other hand, in the high-sensitivity image, when the luminance level of the center pixel is low, the filter shown in FIG. 5A is used, and when the luminance level of the center pixel is high, the filter shown in FIG. 5B is used.

(2-3) Third Method

Referring now to FIGS. 6A, 6B to FIG. 8, a third method for improving Halo phenomenon will be described.

In the third method, a non-linear filter which enables the smoothing process while maintaining the boundary of the object is used as a method of generating a brightness component image.

Figure 6A:
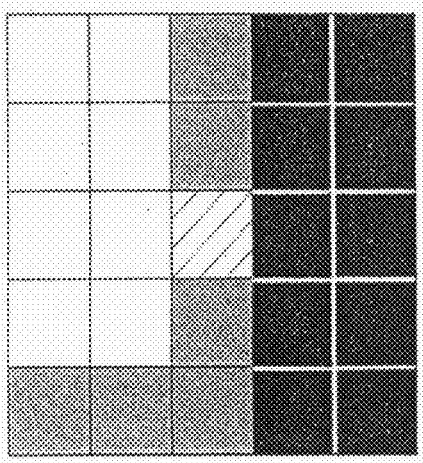
FIGS. 6A and 6B illustrate a $\epsilon$ filter according to the same embodiment.
Figure 6B:
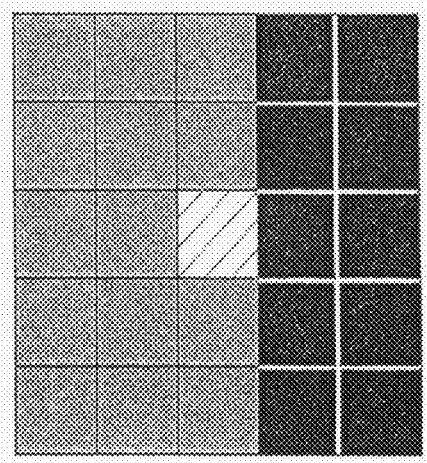

FIGS. 6A and 6B illustrate an example in which ε filter is used as the non-linear filter. In the C filter, the absolute difference in the signal levels of the center pixel and the peripheral pixels of the block to be processed by the filter is obtained and, when the difference value is equal to or smaller than the certain threshold value (hereinafter, referred to as ε value), the values of the peripheral pixels are maintained and, when the difference value is larger than the threshold value, the values of the peripheral pixels are replaced by the value of the pixel at the center.

FIGS. 6A and 6B show an example in which the center pixel is gray, the peripheral pixels are white or black, the difference value between the black peripheral pixels and the gray central pixel is equal to or smaller than the ε value, and the difference value between the white peripheral pixels and the gray center pixel is larger than the ε value (FIG. 6A). Therefore, the white pixels are replaced by the pixel value of the center gray pixel (FIG. 6B), and then the smoothing process of 5×5 is performed.

The ε filter has a property to remove small signal noise (or Gaussian noise) while preserving the edge, a brightness component in which the small signal noise is restrained can be obtained.

As the types of the noises, there is also an impulsive noise, and a median filter is effective for removing the impulsive noise. The median filter is a filter that arranges the pixels in the block in the order of the gradation level and selects a median value.

Figure 7A:
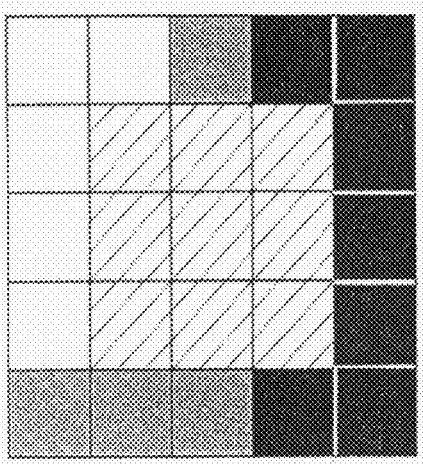
FIGS. 7A and 7B illustrate a $\epsilon$ median filter according to the same embodiment.
Figure 7B:
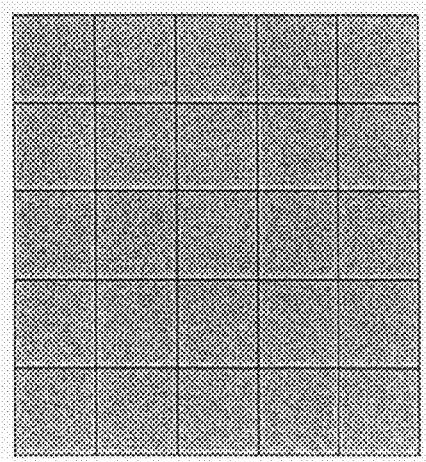

FIGS. 7A and 7B illustrate an example of a median-ε-filter filter including a median filter and the ε filter combined with each other. The block size of the median filter is shown by hatched 3×3 (FIG. 7A), and the block size of the ε filter is shown by dotted 5×5 (FIG. 7B). When the block size is not large, the cost of arithmetic operation can be reduced and, in addition, when the probability of generation of the impulsive noise is not very high, the sufficient effect can be obtained even though the block size is small.

$$W(x, y) = \sum_{i=-k}^{k} \sum_{j=-l}^{l} T(i, j) \cdot Y(x-i, y-j) \qquad (13)$$

if $$|X(x-i, y-j) - med\{X(x, y)\}| \le \varepsilon$$

$$Y(x-i, y-j) = X(x-i, y-j)$$

-continued if $$|X(x-i, y-j) - med\{X(x,y)\}| > \varepsilon$$

$$Y(x-i, y-j) = med\{X(x,y)\}$$

Where W(x, y) designates an output value of the filter, T(i, j) designates a filter coefficient, and Y(x-i, y-j) designates the pixel value in the block. The term med{X(x, y)} is a median value in the block, and when the difference value is larger than ε in the ε filter, it is replaced by the median value.

Subsequently, a method of setting the ε value will be described. Although it may set by any method, it can be changed according to the data of the target input image.

For example, when expanding the contrast of the dark area, the contrast of the noise component is also expanded, and hence the visibility may be impaired. In the dark area or the bright area, blackening or whitening may occur, and hence the signal component of the object is lost in many cases. Therefore, the contrast component is brought to a value close to 1 by remaining the many signals in the brightness component image. In other words, an affect to the combined contrast component image can be reduced.

Figure 8:
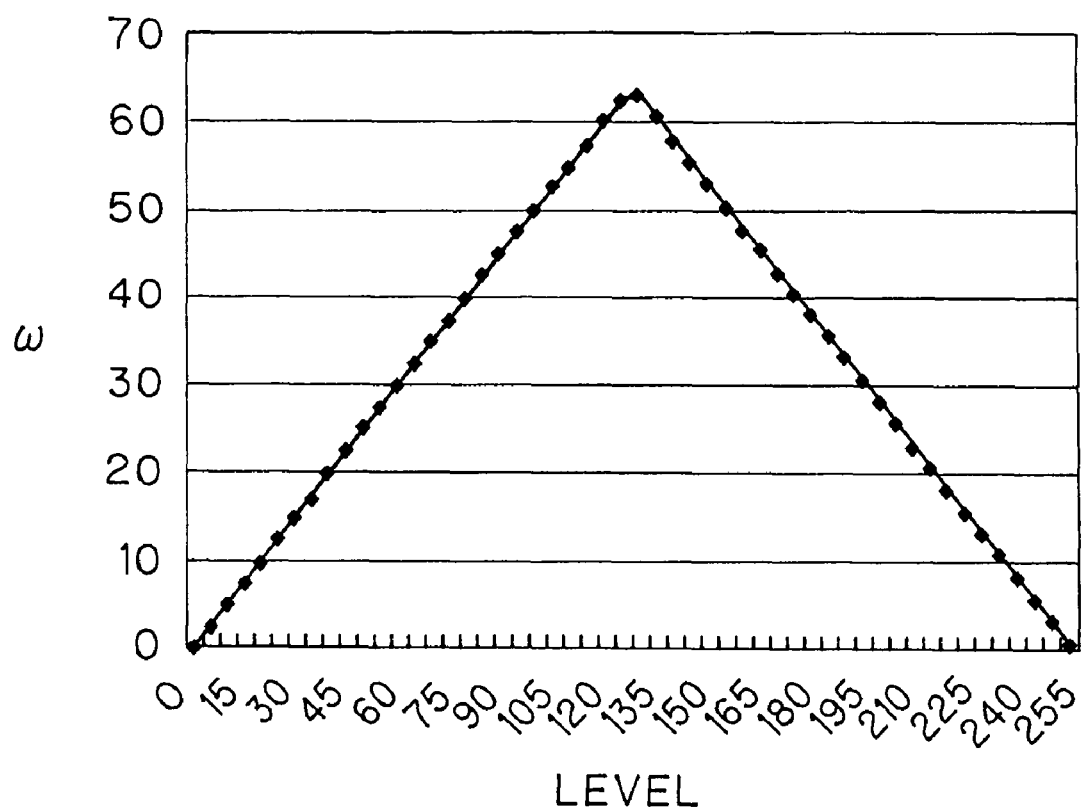
FIG. 8 illustrates an example of a $\epsilon$ value in an image processing in the same embodiment.

More specifically, the ε value is varied according to the gradation level of the input image as in the expression shown below. FIG. 8 shows the ε value when a ξ value is 0.5. In the dark gradation level or the bright gradation level, since the ε value is small, the input image becomes data of the brightness component image as is without being affected by the peripheral pixels. In the intermediate gradation level, since the ε value is large, the smoothing processing data including the input image and the peripheral pixels is the brightness component image data. Therefore, the data of the contrast component image obtained by dividing the input image by the brightness component image is close to 1 in the dark gradation level or the bright gradation level.

$$\varepsilon = (128 - |128 - X(x,y)|) * \xi \quad (14)$$

ξ: arbitrary real number

Fourth Embodiment

The image processing apparatus 10 according to a fourth embodiment of the invention will be described.

In the respective embodiments shown above, the input image is divided by the brightness component image for generating the contrast component image. However, when the brightness component image is 0, the contrast cannot be calculated.

Therefore, it is necessary that the brightness component image is larger than 0. However, since there is a possibility that erroneous signal is immixed also in the brightness component image in actuality, it is recommended to perform preprocess by providing a threshold value Th. Normally, the threshold value Th is set to 1, and the image data must simply be clipped to 1 only for pixels of 0.

However, it is also possible to differentiate the threshold value Th respectively for the low-sensitivity image and the high-sensitivity image.

For example, in the low-sensitivity image, the contrast in the bright object is maintained, and in contrast, the dark object is blackened. Therefore, it is highly likely that the dark object includes much noise, and hence it is recognized to have a low reliability as the image data, so that the threshold value Th is set to a further larger value (10, for example).

On the other hand, in the high-sensitivity image, the bright object is saturated to the white side and hence whitened, and the contrast of the dark object is maintained. Therefore, it is highly likely that the bright object contains much noise and hence it is recognized to have a low reliability as the image data, so that it is also possible to clip the values exceeding the threshold value Th (245, for example).

Fifth Embodiment

Referring now to FIGS. 9A and 9B, and FIGS. 10A and 10B, the image processing apparatus 10 according to a fifth embodiment of the invention will be described.

As in the first embodiment, the weight adding can be employed for generating the combined brightness component image. However, when the brightness is significantly different from the low-sensitivity image and the high-sensitivity image, the brightness becomes entirely dark or bright, and hence blackening (the image data becomes to a value close to 0) or whitening (the image data becomes the maximum gradation 255) may occur when the contrast component is multiplied. Therefore, the effect of contrast expansion can hardly be obtained.

Therefore, in order to bring an average gradation level of the combined brightness component image to a desired gradation level, it is effective to adjust the brightness of the brightness component images. A method thereof will be described below.

(1) First Method

Figure 9A:
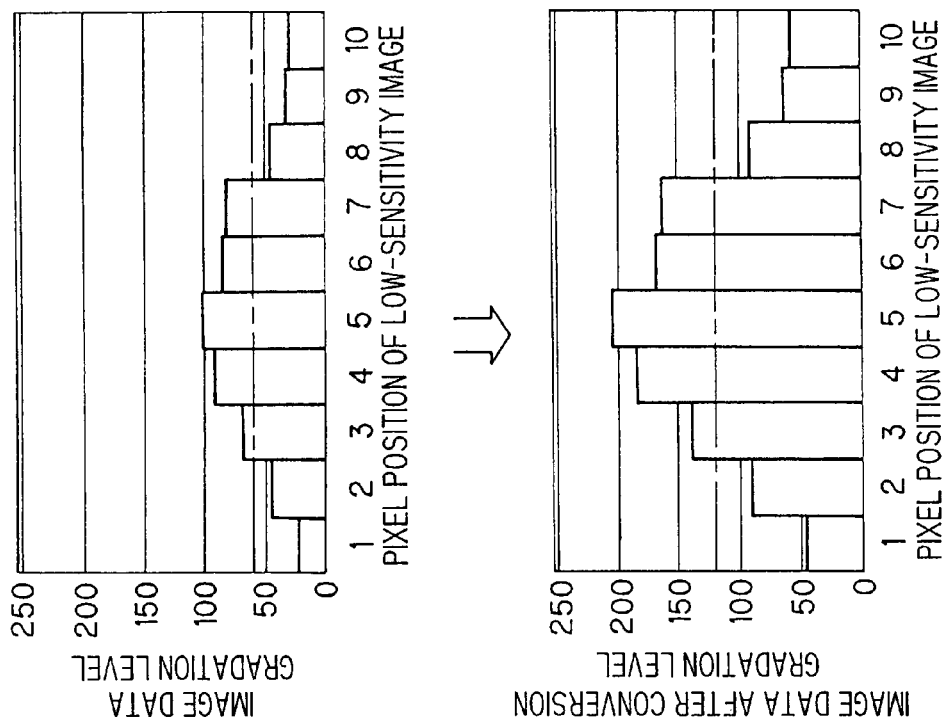
FIGS. 9A and 9B are image data to be converted in the image processing apparatus according to a fifth embodiment.
Figure 9B:
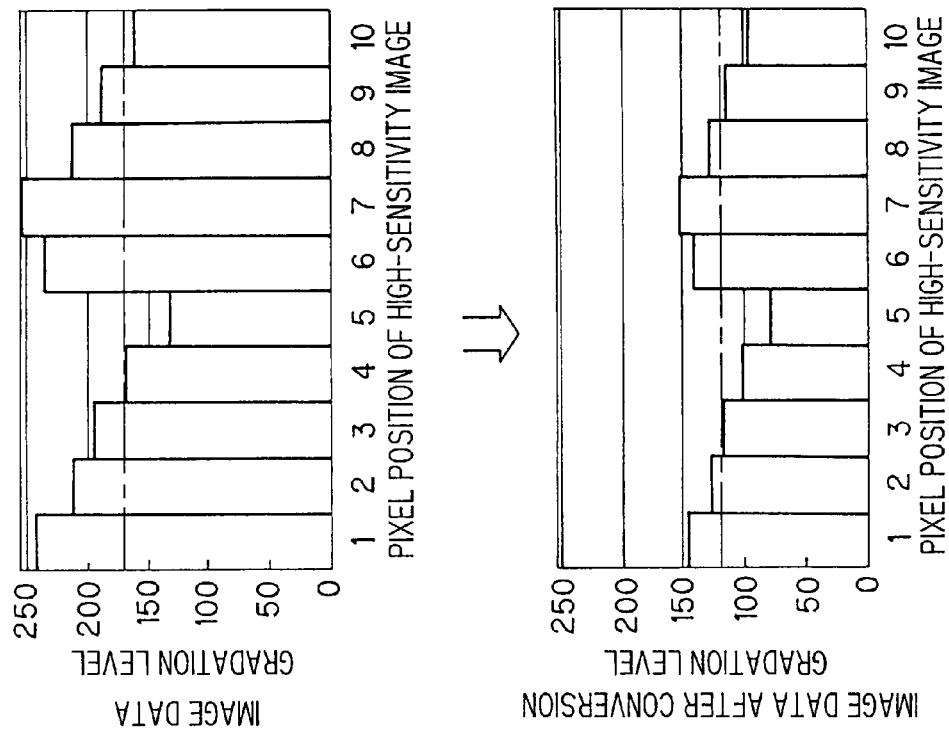

In a first method, for example, in order to bring average gradation level of the combined brightness component image to 120, when the average gradation level of the brightness component image of the high-sensitivity image is 200 and the average gradation level of the brightness component image of the low-sensitivity image is 60, the respective pixels of the high-sensitivity image is multiplied by 0.6 (=120/200), and the respective pixels of the low-sensitivity image is multiplied by 2.0 (=120/60) to achieve the same gradation level 120 as preprocess. FIGS. 9A and 9B illustrate an example in which the image data is converted. FIG. 9A shows the result of processing of the high-sensitivity image, and FIG. 9B shows the result of processing of the low-sensitivity image, respectively.

(2) Second Method

As a second method, it is also possible to obtain the average gradation level using only reliable data from the reason that in the low-sensitivity image, the contrast of the bright object is maintained, but the dark object is blackened, while in the high-sensitivity image, the bright object is saturated to white side and whitened, and the contrast of the dark object is maintained.

For example, it is also possible to obtain the average gradation level of the brightness component image of the low-sensitivity image using only the image data larger than the preset threshold value Th (10, for example) in the low-sensitivity image, then obtain the average gradation level of the brightness component image of the high-sensitivity image using only the image data smaller than the preset threshold value Th (245, for example) in the high-sensitivity image, and then modulate the respective average gradation levels to be the average gradation level of the combined brightness component image.

(3) Third Method

As shown in the first method, there is a method of adjusting the brightness of the combined brightness component image using an average brightness of the respective brightness component images of the low-sensitivity image and the high-sensitivity image for generating the combined brightness component image. Instead, as a third method, it is also possible to obtain histograms respectively and perform a histogram smoothing process as preprocess.

Although the histogram smoothing process may be performed by any methods, for example, when converting the luminance of a certain gradation level L1 to L2 by smoothing in the low-sensitivity image, an accumulated number of pixels C1 (L1) contained up to L1 and an accumulated number of pixels C2 (L2) contained up to L2 after smoothing are set to be the same. The conversion shown above may be achieved using the following expression.

Figure 10A:
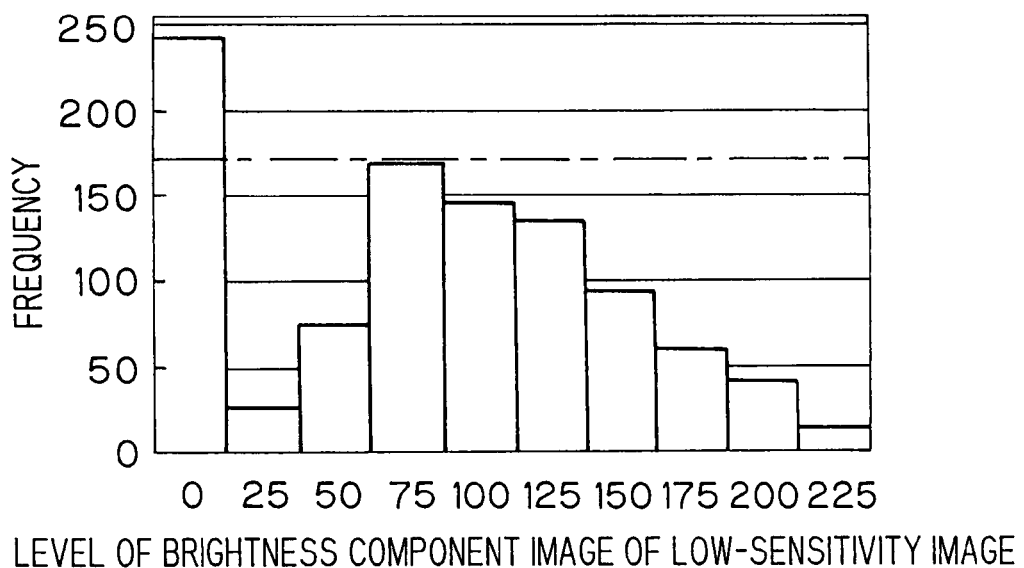
FIGS. 10A and 10B are image data to be converted in the image processing apparatus according to the same embodiment.
Figure 10B:
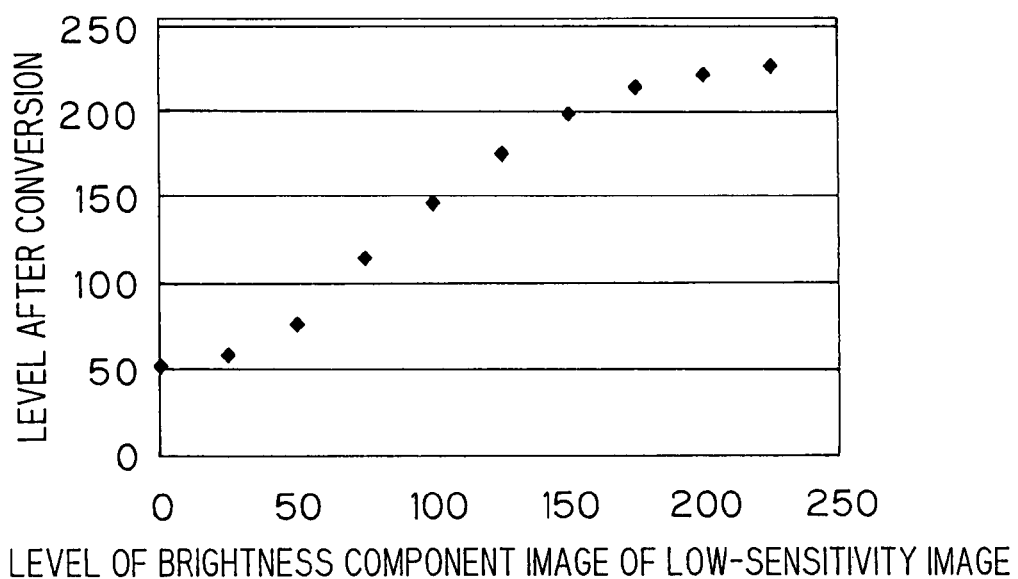

FIGS. 10A and 10B illustrate an example in which the image data is converted. FIG. 10A shows the histogram of the brightness component image of the low-sensitivity image, and FIG. 10B shows a result of conversion of the respective signal levels of the brightness component image in the low-sensitivity image by the histogram smoothing process.

$$C_2(L2) = ((S - S/256)/255) * L2 + S/256 = S/256 * (L2 + 1) \quad (15)$$

$$C_1(L1) = C_2(L2) \quad (16)$$

$$L2 = C_1(L1) * 256/S - 1 \quad (17)$$

S: number of pixels of the entire screen (4) Fourth Method

A fourth method will be described. In the low-sensitivity image, the contrast of the bright object is maintained, and in contrast, the dark object is blackened. On the other hand, in the high-sensitivity image, the bright object is saturated to white side and hence whitened, and the contrast of the dark object is maintained. Therefore, in the fourth method, only the reliable data is accumulated respectively, modulated so that the luminance levels after accumulation become the same.

For example, modulation is performed so that a luminance level LN in which the number of accumulated pixels reaches N after having accumulated the numbers of pixels of the respective levels from the maximum luminance level 255 in descending order in the low-sensitivity image, and a luminance level LM in which the number of accumulated pixels reaches M after having accumulated the numbers of pixels of the respective luminance levels from the lowest luminance level 0 in ascending order in the high-sensitivity image become such that the sum of N and M substantially matches the number of pixels S of the entire screen.

Sixth Embodiment

The image processing apparatus 10 according to a sixth embodiment of the invention will be described.

In order to generate the combined contrast component image, the combined contrast component image can be obtained using the multiplication value of the respective contrast component images of the low-sensitivity image and the high-sensitivity image as in the first embodiment.

The reason is that in the low-sensitivity image, the contrast of the bright object is maintained, and in contrast, the dark object is blackened. On the other hand, in the high-sensitivity image, the bright object is saturated to white side and hence whitened, and the contrast of the dark object is maintained. Therefore, the black object in the low-sensitivity image has a contrast of 1, and when it is multiplied by the contrast component of the high-sensitivity image, the contrast component of the high-sensitivity image is equal to the combined contrast image, while the bright object in the high-sensitivity image has a contrast of 1, and when it is multiplied by the contrast component of the low-sensitivity image, the contrast component of the low-sensitivity image is equal to the combined contrast image. Accordingly, in the combined contrast component image, an image in which the contrast from the dark object to the bright object is maintained is obtained.

Therefore, in the sixth embodiment, the contrast component is modulated according to the luminance level as a method different from the first embodiment.

The reliability of the contrast component of the dark object in the low-sensitivity image is low, while the reliability of the contrast component of the bright object in the high-sensitivity image is low. Therefore, the respective data of the contrast component images are exponentiated and modulated so that the contrast of the pixels whose luminance level of the brightness component image is low becomes a value close to 1 in the low-sensitivity image and the contrast of the pixels whose luminance level of the brightness component image is high becomes a value close to 1 in the high-sensitivity image. The above-described procedure can be expressed as the expression shown below.

$$Q_{L\_LCC2} = Q_{L\_LCC}^{L1/255 \cdot L\_\tau} \quad (18)$$

$$Q_{H\_LCC2} = Q_{H\_LCC}^{(L1-255)/255 \cdot H\_\tau} \quad (19)$$

$Q_{L\_LCC}$: contrast component of the low-sensitivity image before conversion $Q_{L\_LCC2}$: contrast component of the low-sensitivity image after conversion $Q_{H\_LCC}$: contrast component of the high-sensitivity image before conversion $Q_{H\_LCC2}$: contrast component of the high-sensitivity image after conversion $L\_\tau, H\_\tau$; arbitrary real number Seventh Embodiment Referring now to FIG. 11, the image processing apparatus 10 according to a seventh embodiment of the invention will be described.

In order to generate the combined contrast component image, noise is immixed to the contrast component due to the influence of the noise in the input image in the respective contrast component images of the low-sensitivity image and the high-sensitivity image.

Therefore, as shown in a block diagram in FIG. 11A, the noise can be removed also from the combined contrast-expanded image by performing noise removal also in the contrast component image.

The method of removing noise from the respective contrast component images may be achieved by using the linear filter or the non-linear filter described above. More preferably, the non-linear filter is better since it is desired to express the contrast between the adjacent pixels clearly. Since the contrast component may often be an extremely large value due to the dividing process, the removal of the impulsive noise is effective.

As shown in a block diagram in FIG. 11B, it is possible to multiply the respective contrast component images after having removed the noise from the respective contrast component images to obtain the combined contrast image.

It is also possible to remove the noise after having multiplied the respective contrast component images to obtain the combined contrast image.

Eighth Embodiment

Figure 12:
FIG. 12 is a block diagram of the image processing apparatus according to an eighth embodiment.

Referring now to FIG. 12, the image processing apparatus 10 according to an eighth embodiment of the invention will be described.

The contrast-expanded image is generated by multiplying the combined brightness component image and the combined contrast component image. However, when the image data of the combined brightness component image is large and the image data of the combined contrast component image is also large, the obtained contrast-expanded image exceeds the maximum gradation level which can be displayed on a display device.

Simply speaking, the image data of the contrast-expanded image which exceeds the maximum gradation level (255, for example) which can be displayed is replaced by 255. On the other hand, when the image data of the combined brightness component image is small, and the image data of the combined contrast component image is also small, the image data of the contrast-expanded image becomes 0. In this manner, when the data is deviated to 0 or over 255 in the contrast-expanded image, the image is blackened or whitened.

Therefore, it is effective to increase the number of operating levels (1024, for example) in the contrast-expanded image, and performs coefficient operation as in the first method in the fifth embodiment to convert into 255, or to perform the histogram smoothing process as in the third method in the fifth embodiment.

FIG. 12 shows a block diagram of the eighth embodiment, in which the coefficient operation and the histogram smoothing process are performed in a level conversion process.

Ninth Embodiment

An imaging device 200 according to a ninth embodiment of the invention will be described.

In order to generate the contrast-expanded image, the imaging device 200 for acquiring the low-sensitivity image and the high-sensitivity image is necessary in addition to the image processing apparatus 10 described above.

Figure 13:
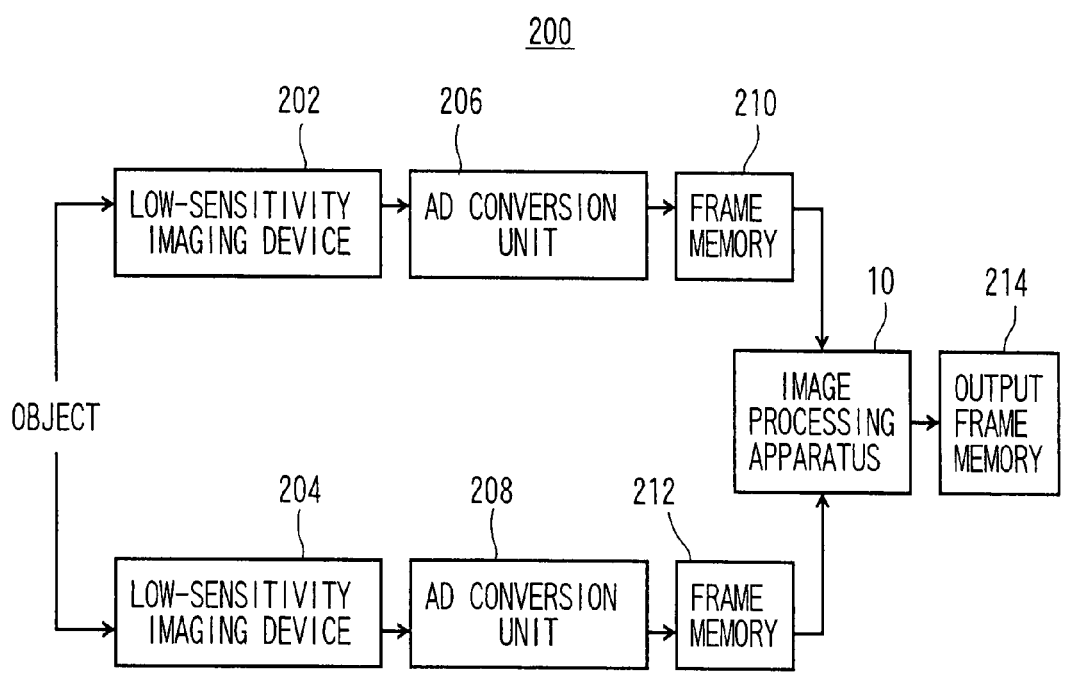
FIG. 13 is a block diagram of an imaging device according to the first embodiment of the invention.

FIG. 13 is a block diagram of the imaging device 200 including the image processing apparatus 10.

As shown in FIG. 13, the imaging device 200 basically includes imaging devices 202, 204 including CMOS that can pick up two images of the low-sensitivity image and the high-sensitivity image, AD conversion units 206, 208 that convert the respective images from the analogue data to digital data, respectively, frame memories 210, 212 that store the digital data, the image processing apparatus 10 that reads out the data from the respective frame memories 210, 212 and performs image processing of the embodiments, and a frame memory 214 that stores the contrast-expanded image.

Tenth Embodiment

Referring now to FIG. 14, the imaging device 200 according to a tenth embodiment of the invention will be described.

As the imaging devices 202, 204 for acquiring the low-sensitivity image and the high-sensitivity image, a configuration having an element 216 whose aperture is small and an element 218 whose aperture is large is provided, so that the image processing according to the respective apertures can be established.

Figure 14A:
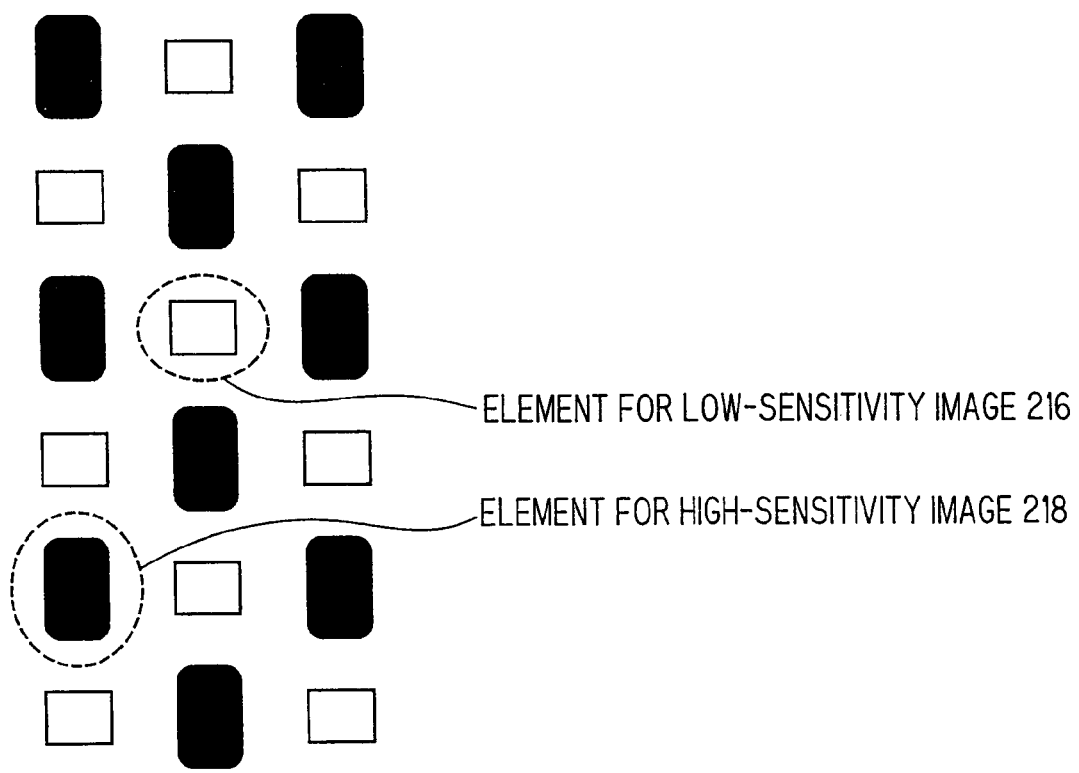
FIGS. 14A and 14B are drawings showing a configuration of an imaging device in the imaging device according to the second embodiment.

For example, as shown in FIG. 14A, the size of the aperture of the element 218 of the device for the high-sensitivity image is two times the size of the aperture of the elements 216 of the device for the low-sensitivity image, and the respective elements are arranged in a checkered pattern.

Assuming that the respective picked-up images are neither blackened nor whitened, and have no noise, the brightness of the high-sensitivity image becomes two times the brightness of the low-sensitivity image as an ideal result. Therefore, the brightness component image should be approximately two times also in the image processing.

Actually, since the whitening or blackening occurs, it does not necessarily have to be two times depending on the object. Here, the intermediate level of the high-sensitivity image and the intermediate level of the low-sensitivity image are extracted and whether or not the adjacent pixels have the image data is inspected.

Figure 14B:
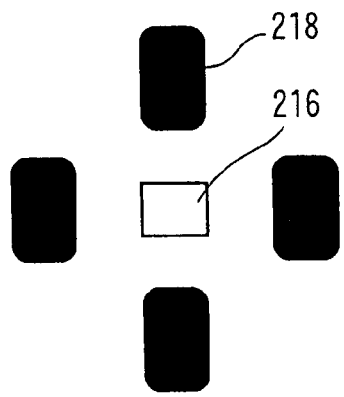

For example, even when only one, not more, of the four high-sensitivity images in the periphery of the low-sensitivity image has an image data of the intermediate level as shown in FIG. 14B, the data of the pixel of the low-sensitivity image in question is considered to be effective. In contrast, when none of the four high-sensitivity images in the periphery of the low-sensitivity image has the image data of the intermediate level, it is recognized that both of the low-sensitivity image and the high-sensitivity images could not be picked up simultaneously in the periphery, and hence the data of the pixel of the low-sensitivity image in question is determined to be ineffective. Determination between effective and ineffective is performed also for the data of the pixels of the high-sensitivity images in the same manner. Then, the average value is obtained using only the data of the effective pixels, and the processing of the sixth embodiment is continued. With the processing as described thus far, the device and the image processing can be adjusted effectively.

Eleventh Embodiment

Figure 15A:
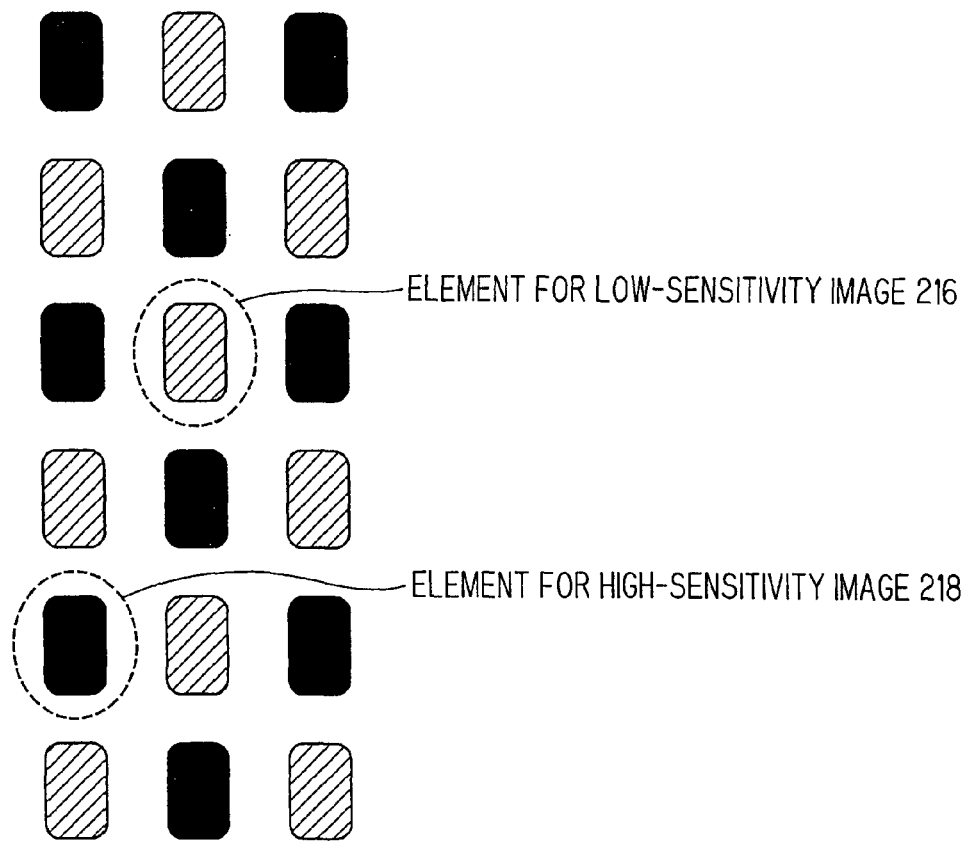
FIGS. 15A and 15B are drawings showing a configuration of the imaging device in the imaging device according to the third embodiment.
Figure 15B:
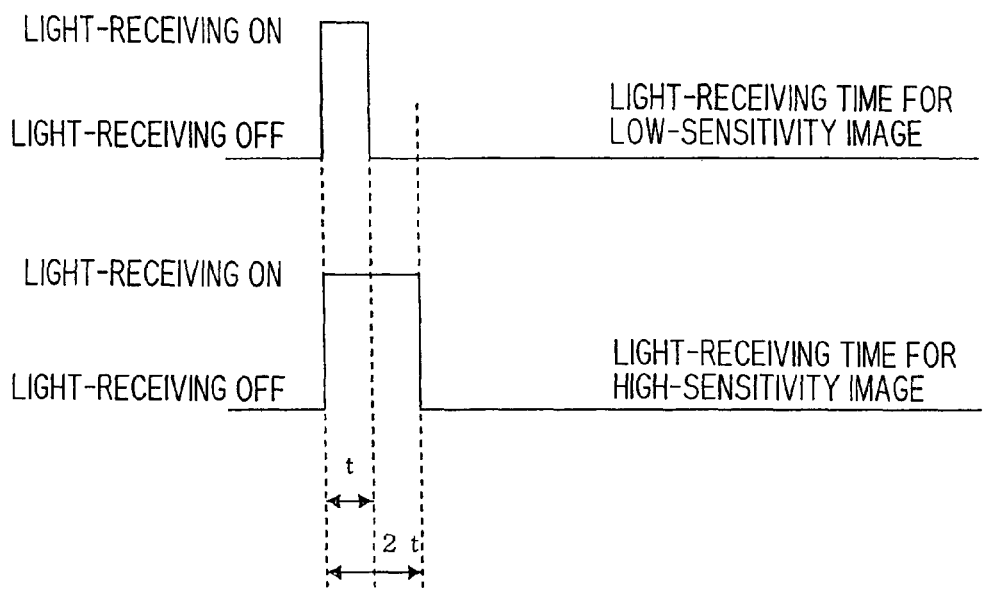

Referring now to FIG. 15, the imaging device 200 according to an eleventh embodiment of the invention will be described.

As the imaging devices 202, 204 for acquiring the low-sensitivity image and the high-sensitivity image, a configuration having the both elements 216 whose light-receiving time is short and the elements 218 whose light-receiving time is long is provided so that the image processing according to the respective light-receiving times can be established.

For example, as shown in FIG. 15, the light-receiving time of the elements 216 for the low-sensitivity image is set to be half the light-receiving time of the element 218 of the high-sensitivity image. The control of the light-receiving time as such can be realized by controlling the timing to start reading the data from the respective elements.

The image processing method can be used as an adjustment parameter in generation of the brightness component image as the imaging device 200 in the second embodiment.

Although two elements can be provided as described above, a configuration in which image pick-up can be performed for two light-receiving times with one element is also applicable.

Modification

The invention is not limited to the embodiments described above, and may be modified in various manners without departing the scope of the invention.

For example, there is a method effective for generating a visible image with expanded contrast from two or more original images different in exposure condition obtained by a different method including CCD.

It is also possible to use images in R, G and B, or images in complementary colors of cyan, magenta, yellow and green instead of the monochrome image or the color image shown above.

Although the description has been made using the image picked up in two sensitivities, that is, the low-sensitivity image and the high-sensitivity image in the embodiments shown above, the same procedure can be applied also to the case in which various sensitivity images picked up in three or more sensitivities are used.

What is claimed is:

1. An image processing apparatus comprising:
a first image generator that generates each of a plurality of first images by applying a smoothing filter to each of a plurality of input images of a single object picked up with various sensitivities;
a second image generator that generates each of a plurality of second images by dividing a pixel value of each pixel of the each input image by a pixel value of a collocated pixel of the each first image;
a third image generator that generates a third image by adding pixel values of collocated pixels in the first images;
a fourth image generator that generates a fourth image by multiplying pixel values of collocated pixels in the second images; and
an output image generator that generates an output image by multiplying a pixel value of each pixel of the third image and a pixel value of a collocated pixel of the fourth image.

2. The apparatus of claim 1, further comprising:
an extracting unit that extracts a luminance component, a first color-difference component and a second color-difference component from the each input image to generates each of a plurality of luminance images, a plurality of first color-difference images and a plurality of second color-difference images;
a third color-difference image combining unit that adds pixel values of collocated pixels in the first color-difference images to generate a third color-difference image; and
a fourth color-difference image combining unit that adds pixel values of collocated pixels in the second color-difference images to generate a fourth color-difference image;
wherein the first image generator generates the first images using the luminance images as new input images, and
the output image generator generates a new output image by combining the third color-difference image and the fourth color-difference image with the output image.

3. The apparatus of claim 1, wherein the first image generator uses a linear low-pass filter or a non-linear low-pass filter of an edge preservation type as the smoothing filter.

4. The apparatus of claim 1, wherein the third image generator generates the third image after having adjusted the each first image to an average gradation level.

5. The apparatus of claim 4, wherein the adjustment of the third image generator comprises:
obtaining a histogram of the first image;
obtaining a weighted average value of the each first image on the basis of the histogram; and
adjusting the each first image to the average gradation level by the weighted average value.

6. The apparatus of claim 1, wherein the fourth image is obtained by applying the smoothing filter to the second images and multiplying the pixel values of the collocated pixels of the smoothing filter-applied images.

7. The apparatus of claim 1, wherein the output image generator performs threshold value processing so that the multiple value of the third image and the fourth image falls within the gradation level which can be inputted to a display device that displays the output image.

8. An imaging device comprising:
an image pick-up unit that picks up the input images of the single object with at least two sensitivities,
wherein the input images is processed by the image processing apparatus of claim 1.

9. The imaging device of claim 8, wherein the image pick-up unit comprises:
a light-receiving element that acquires a low-sensitivity image; and
a light-receiving element that acquires a high-sensitivity image, the light-receiving element having an aperture larger than that of the light-receiving element of the low-sensitivity image.

10. The imaging device of claim 8, wherein the image pick-up unit comprises:
a light-receiving element that acquires a low-sensitivity image; and
a light-receiving element that acquires a high-sensitivity image, the light-receiving element having a light-receiving time longer than a light-receiving time for the low-sensitivity image.

11. An image processing method comprising:
generating each of a plurality of first images by applying a smoothing filter to each of a plurality of input images of a single object picked up with various sensitivities;
generating each of a plurality of second images by dividing a pixel value of each pixel of the each input image by a pixel value of a collocated pixel of the each first image;
generating a third image by adding pixel values of collocated pixels in the first images;
generating a fourth image by multiplying pixel values of collocated pixels in the second images; and
generating an output image by multiplying a pixel value of each pixel of the third image and a pixel value of a collocated pixel of the fourth image.

* * * * *